United States Patent
Harris et al.

(10) Patent No.: US 10,839,229 B2
(45) Date of Patent: Nov. 17, 2020

(54) PIXEL-BASED EVENT DETECTION FOR TRACKING, HOSTILE FIRE INDICATION, GLINT SUPPRESSION, AND OTHER APPLICATIONS

(71) Applicant: Raytheon Company, Waltham, MA (US)

(72) Inventors: Micky R. Harris, Lompoc, CA (US); Eric J. Beuville, Goleta, CA (US); Juliette S. Costa, Santa Barbara, CA (US); Christian M. Boemler, Goleta, CA (US); Mark A. Massie, Solvang, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/279,182

(22) Filed: Feb. 19, 2019

(65) Prior Publication Data

US 2019/0180113 A1   Jun. 13, 2019

Related U.S. Application Data

(63) Continuation of application No. 15/424,509, filed on Feb. 3, 2017, now Pat. No. 10,242,268.

(51) Int. Cl.
*G06K 9/00* (2006.01)
*H04N 5/369* (2011.01)
(Continued)

(52) U.S. Cl.
CPC ........ *G06K 9/00771* (2013.01); *G01J 1/0266* (2013.01); *G01S 17/04* (2020.01);
(Continued)

(58) Field of Classification Search
CPC .......... G06K 9/00771; G06K 9/00744; G06K 2009/00738; G01S 17/04; H04N 5/37455;
(Continued)

(56) References Cited

U.S. PATENT DOCUMENTS 5,200,623 A   4/1993   Cannata
5,585,942 A   12/1996  Kondo
(Continued)

FOREIGN PATENT DOCUMENTS

EP   2582131 A2   4/2013
WO   2007/111912 A2   10/2007

OTHER PUBLICATIONS

Communication pursuant to Article 94(3) EPC dated Jan. 29, 2020 in connection with European Patent Application No. 17792234.1, 5 pages.

(Continued)

*Primary Examiner* — Marnie A Matt

(57) ABSTRACT

A method includes repeatedly charging and discharging a capacitor, where the capacitor is charged based on illumination received at a pixel. The method also includes comparing a voltage stored on the capacitor with a reference voltage using a comparator. The method further includes incrementing or decrementing a first counter value of a first counter each time a comparator output indicates that the capacitor voltage has reached the reference voltage during a first period of time. The method also includes incrementing or decrementing a second counter value of a second counter each time the comparator output indicates that the capacitor voltage has reached the reference voltage during multiple smaller second periods of time within the first period of time. In addition, the method includes resetting the second counter for each second period of time and generating a (Continued)

pixel event indicator in response to the second counter value obtaining a value indicative of a bright intensity event.

20 Claims, 4 Drawing Sheets

(51) Int. Cl.
   *H04N 5/355* (2011.01)
   *H04N 5/14* (2006.01)
   *H04N 1/409* (2006.01)
   *G01J 1/02* (2006.01)
   *G01T 1/17* (2006.01)
   *H04N 5/3745* (2011.01)
   *G01S 17/04* (2020.01)

(52) U.S. Cl.
   CPC .......... *G01T 1/171* (2013.01); *G06K 9/00744* (2013.01); *H04N 1/4092* (2013.01); *H04N 5/144* (2013.01); *H04N 5/147* (2013.01); *H04N 5/3559* (2013.01); *H04N 5/3696* (2013.01); *H04N 5/37455* (2013.01); *G06K 2009/00738* (2013.01)

(58) Field of Classification Search
   CPC ...... H04N 5/144; H04N 1/4092; H04N 5/147; H04N 5/3559; H04N 5/3696; G01T 1/171; G01J 1/0266
   See application file for complete search history.

(56) References Cited

U.S. PATENT DOCUMENTS

| | | |
|---|---|---|
| 6,618,117 B2 | 9/2003 | Silverbrook |
| 7,349,574 B1 | 3/2008 | Sodini et al. |
| 2002/0135743 A1 | 9/2002 | Gindele |
| 2007/0075888 A1 | 4/2007 | Kelly et al. |
| 2007/0125951 A1 | 6/2007 | Snider et al. |
| 2008/0099689 A1 | 5/2008 | Nygard et al. |
| 2008/0218616 A1 | 9/2008 | Wenger |
| 2010/0208986 A1 | 8/2010 | Cobb et al. |
| 2010/0226495 A1* | 9/2010 | Kelly .................... G06F 21/602 380/30 |
| 2010/0231562 A1 | 9/2010 | Brown |
| 2010/0237252 A1 | 9/2010 | Jin et al. |
| 2013/0003911 A1* | 1/2013 | Schultz .................. H03M 1/60 377/54 |
| 2013/0088594 A1 | 4/2013 | Wyles et al. |
| 2014/0231646 A1* | 8/2014 | Makino .................. G01T 1/172 250/336.1 |
| 2015/0036005 A1 | 2/2015 | Kelly et al. |

OTHER PUBLICATIONS

Schultz et al., "Digital-Pixel Focal Plane Array Technology", Lincoln Laboratory Journal, vol. 20, No. 2, 2014, pp. 36-51.
International Search Report and Written Opinion of the International Searching Authority for PCT Patent Application No. PCT/US2017/055506 dated Jan. 3, 2018, 14 pages.
Office Action dated Aug. 20, 2020 in connection with counterpart Korean Patent Application No. 10-2019-7016840, 20 pages.

* cited by examiner

PIXEL-BASED EVENT DETECTION FOR TRACKING, HOSTILE FIRE INDICATION, GLINT SUPPRESSION, AND OTHER APPLICATIONS

CROSS-REFERENCE TO RELATED APPLICATION AND PRIORITY CLAIM

This application is a continuation of U.S. patent application Ser. No. 15/424,509 filed on Feb. 3, 2017, which is hereby incorporated by reference in its entirety.

TECHNICAL FIELD

This disclosure generally relates to imaging systems. More specifically, this disclosure relates to pixel-based event detection for tracking, hostile fire indication, glint suppression, and other applications.

BACKGROUND

A typical imaging system or "imager" can capture a series of image frames at a specified frame rate. Unfortunately, the temporal bandwidth of an imager is limited by the frame rate of the captured image frames. If an event occurs that is bright in intensity but that is shorter than the frame rate, information identifying when the event occurred can be lost due to the poor temporal resolution of the imager. The bright intensity of the event can also limit the ability of the imager to discern spatial information in a scene. Various bright events that could affect an imager include glint from reflective objects, muzzle flashes from weapons, or rocket propelled grenade launches.

One conventional approach to solving this problem includes the use of analog peak and derivative filtering. However, this approach typically consumes a large amount of power and does not work well with advanced digital imaging systems, such as those that use complementary-metal-oxide semiconductor (CMOS) pixels. Another conventional approach is to increase the overall frame rate of an imager and post-process image frames to locate events, but this approach lowers the sensitivity of the imager and drastically increases the amount of power consumed by the overall system.

SUMMARY

This disclosure provides pixel-based event detection for tracking, hostile fire indication, glint suppression, and other applications.

In a first embodiment, a method includes repeatedly charging and discharging a capacitor, where the capacitor is charged based on illumination received at a pixel. The method also includes comparing a voltage stored on the capacitor with a reference voltage using a comparator. The method further includes incrementing or decrementing a first counter value of a first counter of a detector during a first period of time. The first counter value is incremented or decremented each time an output of the comparator indicates that the voltage stored on the capacitor has reached the reference voltage. The first counter value at an end of the first period of time is indicative of an intensity of the illumination received by the pixel during the first period of time. The method also includes incrementing or decrementing a second counter value of a second counter of the detector during multiple smaller second periods of time within the first period of time. The second counter value is incremented or decremented each time the output of the comparator indicates that the voltage stored on the capacitor has reached the reference voltage. The second counter has a lower bit resolution than the first counter so that the second counter is able to roll over the second counter value more frequently than the first counter is able to roll over the first counter value. In addition, the method includes resetting the second counter for each of the second periods of time and generating a pixel event indicator in response to the second counter value obtaining a specified value indicative of a bright intensity event.

In a second embodiment, an apparatus includes a capacitor configured to be repeatedly charged based on illumination received at a pixel and discharged. The apparatus also includes a comparator configured to compare a voltage stored on the capacitor with a reference voltage. The apparatus further includes a detector having a first counter, a second counter, and a latch. The first counter is configured to increment or decrement a first counter value during a first period of time. The first counter is configured to increment or decrement the first counter value each time an output of the comparator indicates that the voltage stored on the capacitor has reached the reference voltage. The first counter value at an end of the first period of time is indicative of an intensity of the illumination received by the pixel during the first period of time. The second counter is configured to increment or decrement a second counter value during multiple smaller second periods of time within the first period of time. The second counter is configured to increment or decrement the second counter value each time the output of the comparator indicates that the voltage stored on the capacitor has reached the reference voltage. The second counter has a lower bit resolution than the first counter so that the second counter is able to roll over the second counter value more frequently than the first counter is able to roll over the first counter value. The second counter is configured to be reset for each of the second periods of time. The latch is configured to generate a pixel event indicator in response to the second counter value obtaining a specified value indicative of a bright intensity event.

In a third embodiment, a system includes a focal plane array having multiple pixels. The system also includes, for each of at least some of the pixels, a capacitor configured to be repeatedly charged based on illumination received at the pixel and discharged, a comparator configured to compare a voltage stored on the capacitor with a reference voltage using a comparator, and a detector having a first counter, a second counter, and a latch. The first counter is configured to increment or decrement a first counter value during a first period of time. The first counter is configured to increment or decrement the first counter value each time an output of the comparator indicates that the voltage stored on the capacitor has reached the reference voltage. The first counter value at an end of the first period of time is indicative of an intensity of the illumination received by the pixel during the first period of time. The second counter is configured to increment or decrement a second counter value during multiple smaller second periods of time within the first period of time. The second counter is configured to increment or decrement the second counter value each time the output of the comparator indicates that the voltage stored on the capacitor has reached the reference voltage. The second counter has a lower bit resolution than the first counter so that the second counter is able to roll over the second counter value more frequently than the first counter is able to roll over the first counter value. The second counter is configured to be reset for each of the second periods of time. The latch is configured to generate a pixel event indicator in response to the second counter value obtaining a specified value indicative of a bright intensity event.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
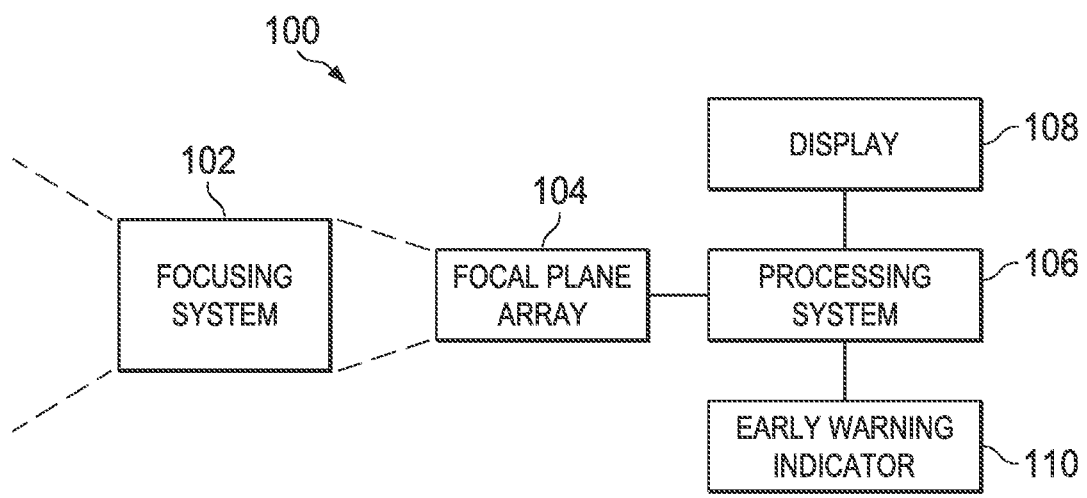
FIG. 1 illustrates an example system supporting pixel-based event detection according to this disclosure.

FIG. 1 illustrates an example system 100 supporting pixel-based event detection according to this disclosure. As shown in FIG. 1, the system 100 includes a focusing system 102, a focal plane array 104, and a processing system 106. The focusing system 102 generally operates to focus illumination from a scene onto the focal plane array 104. The focusing system 102 could have any suitable field of view that is directed onto the focal plane array 104, such as a 60° by 60° field of view. The focusing system 102 includes any suitable structure(s) for focusing illumination, such as one or more lenses, mirrors, or other optical devices.

The focal plane array 104 generally operates to capture images of a scene. The focal plane array 104 includes a matrix or other collection of pixels that generate electrical signals representing a scene. The focal plane array 104 could capture images in any suitable spectrum or spectra, such as in the visible, infrared, or ultraviolet spectrum. The focal plane array 104 could also have any suitable resolution, such as when the focal plane array 104 includes a collection of approximately 8,000 pixels by approximately 8,000 pixels. The focal plane array 104 includes any suitable collection of pixels that capture images. The focal plane array 104 could also include additional components that facilitate the receipt and output of information from the pixels, such as readout integrated circuits (ROICs).

As described in more detail below, the focal plane array 104 includes pixel-based event detectors that are used with digital pixels to discriminate events of a selected intensity. A filter in each detector can be formed using a low resolution counter (such as a one-bit or few-bit counter) and a frequency reference. The low resolution counter can be incremented by a comparator and reset after a periodic time interval defined by the frequency reference. If the low resolution counter advances to a threshold value within a single periodic time interval, the intensity measured by the pixel has exceeded a specified intensity and thus represents an event of interest.

The output of each pixel-based event detector could therefore be used as an indicator that a high-intensity event has occurred. In order to reduce false alarms (such as from glint or blinkers), local filtering can also be supported by the detectors. The local filtering allows one detector to use outputs from neighboring detectors to verify that an actual event has been detected.

This approach supports the ability to obtain high-resolution temporal information without having to process a large number of image frames. It also provides the ability to process real-time information with the pixel-based detectors as an event is happening in order to recover dynamic range lost from the bright event. Among other things, the detectors can be used to suppress glint, perform local detection of muzzle flashes, or track objects. Additional details regarding the pixel-based detectors are provided below.

The processing system 106 receives outputs from the focal plane array 104 and processes the information. For example, the processing system 106 could process image data generated by the focal plane array 104 in order to generate visual images for presentation to one or more personnel, such as on a display 108. The processing system 106 could also process information from the pixel-based detectors in the focal plane array 104 to determine whether any events of interest have been detected by the pixel-based detectors. If an event has been detected, the processing system 106 can take any suitable actions. For instance, the processing system 106 could present information associated with the detected event on the display 108 or trigger an early warning indicator 110. The display 108 could present any suitable information about a detected event, such as one or more images associated with the event. The early warning indicator 110 could denote any suitable type of indicator, such as an audible or visual alarm.

The processing system 106 includes any suitable structure for processing information from a focal plane array or other imaging system containing pixel-based detectors. For example, the processing system 106 could include one or more processing devices, such as one or more microprocessors, microcontrollers, digital signal processors, field programmable gate arrays, application specific integrated circuits, or discrete logic devices. The display 108 includes any suitable device for graphically presenting information. The early warning indicator 110 includes any suitable structure providing output to one or more personnel.

Although FIG. 1 illustrates one example of a system 100 supporting pixel-based event detection, various changes could be made to FIG. 1. For example, various components in FIG. 1 could be combined, further subdivided, rearranged, or omitted and additional components could be added according to particular needs. Also, FIG. 1 illustrates one example type of system in which pixel-based detectors could be used to identify events of interest. However, this functionality could be used in any other suitable device or system.

Figure 2:
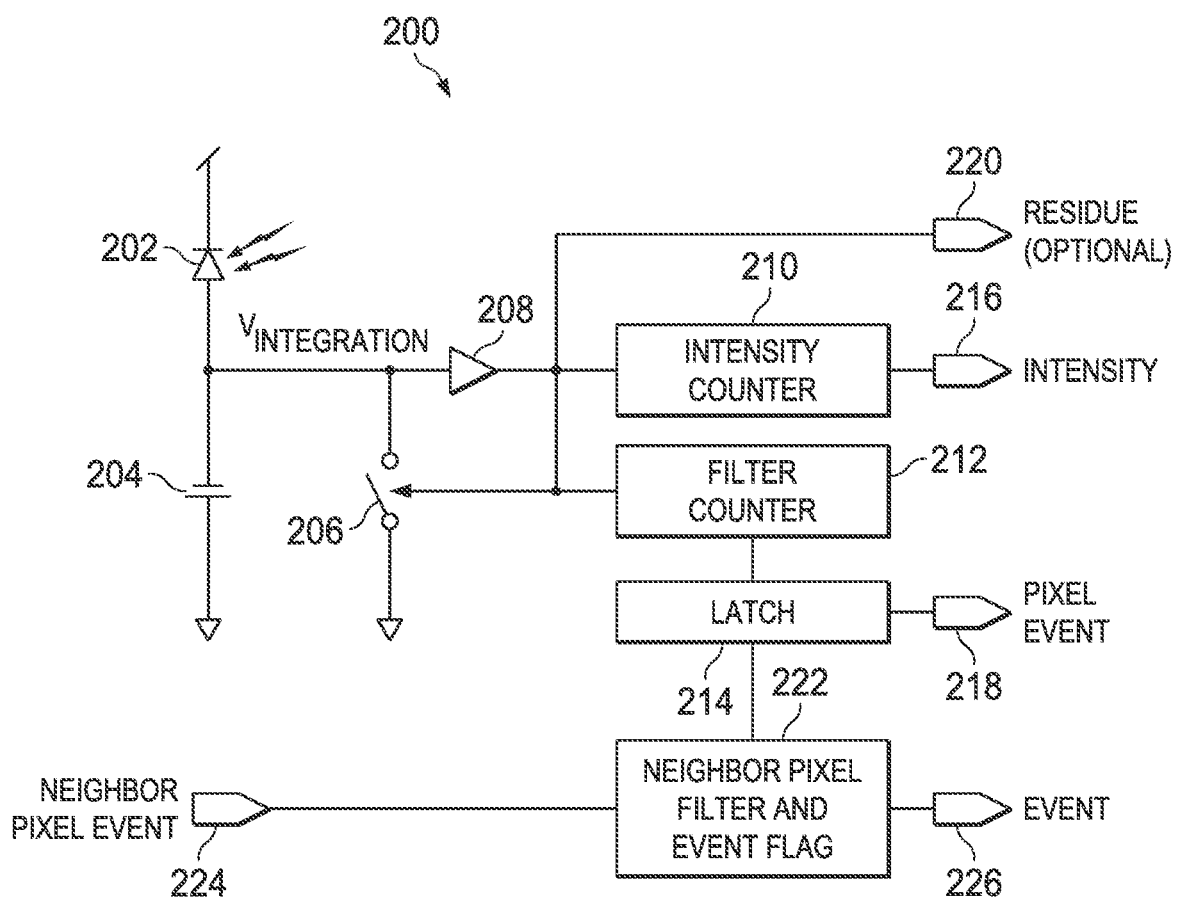
FIG. 2 illustrates an example pixel-based event detector according to this disclosure.

FIG. 2 illustrates an example pixel-based event detector 200 according to this disclosure. For ease of explanation, the detector 200 is described as being used within the focal plane array 104 in the system 100 of FIG. 1. Detectors 200 could be used with all pixels of the focal plane array 104, or the detectors 200 could be used with a subset of the pixels of the focal plane array 104. Note, however, that the detectors 200 could be used in any other suitable device and in any other suitable system.

As shown in FIG. 2, the detector 200 is used in conjunction with a pixel 202. The pixel 202 generates an electrical signal, such as a voltage signal, based on an intensity of incoming illumination received by the pixel 202. The pixel 202 includes any suitable structure for generating a signal based on illumination, such as a photodetector. The pixel 202 could, for example, denote one of the pixels in the focal plane array 104.

A capacitor 204 is coupled in series with the pixel 202 and in parallel with a switch 206. The capacitor 204 stores an electrical charge based on the output of the pixel 202. The capacitor 204 can also be discharged through the switch 206, which is coupled to ground. Opening the switch 206 allows electrical energy from the pixel 202 to charge the capacitor 204, and closing the switch 206 discharges the capacitor 204. The capacitor 204 includes any suitable structure having a desired capacitance. The switch 206 includes any suitable structure configured to selectively form an electrical connection, such as a transistor.

A comparator 208 compares the voltage stored on the capacitor 204, denoted $V_{Integration}$ in FIG. 2, with a reference voltage and generates an output based on the comparison. The output of the comparator 208 has one value when the voltage stored on the capacitor 204 is below the reference voltage and another value when the voltage stored on the capacitor 204 is above the reference voltage. The output of the comparator 208 can be used to control the switch 206, meaning the comparator 208 can discharge the capacitor 204 (after the capacitor's voltage reaches a specified level) by closing the switch 206 and can allow the capacitor 204 to charge by opening the switch 206. The comparator 208 includes any suitable structure for comparing electrical signals.

The comparator 208 also provides its outputs to an intensity counter 210 and a filter counter 212, each of which integrates the comparator's outputs during a periodic time interval defined by a frequency reference. The intensity counter 210 denotes a counter that increments or decrements a counter value each time the output of the comparator 208 indicates the voltage stored on the capacitor 204 has reached a specified level, such as a level greater than the reference voltage. The intensity counter 210 can integrate the outputs of the comparator 208 during each periodic time interval. The intensity counter 210 can also be reset at the end of the current periodic time interval and the beginning of the next periodic time interval so that another integration can occur. The intensity counter 210 therefore generates counter values that are indicative of the intensity of illumination received by the pixel 202 during the periodic time intervals.

While the intensity counter 210 can effectively measure intensity during each periodic time interval, the intensity counter 210 may not be effective at indicating when an extremely fast bright event occurs during a small part of a time interval (faster than the frame rate of the imager). Since the intensity counter 210 integrates intensity over an entire time interval, the intensity of a fast bright event in an otherwise dark time interval could be lost as a result of the integration. For instance, the integrated intensity of an average-intensity time interval could be equivalent to the integrated intensity of an otherwise dark time interval with a fast bright event. The outputs of the intensity counter 210 are not necessarily indicative that a fast bright event has occurred.

The filter counter 212 helps to resolve this problem by integrating the same values as the intensity counter 210 but at a lower bit resolution. The filter counter 212 denotes a counter that increments or decrements a counter value each time the output of the comparator 208 indicates the voltage stored on the capacitor 204 has reached a specified level (i.e., the reference voltage). The filter counter 212 can integrate the outputs of the comparator 208 during each periodic time interval. The filter counter 212 can also be reset at the end of the current periodic time interval and the beginning of the next periodic time interval. However, because the filter counter 212 has a lower bit resolution than the intensity counter 210, the filter counter 212 also "rolls over" its counter value (such as from a maximum value to a minimum value or vice versa) at a much faster rate than the intensity counter 210. Thus, when integrating the same values, the filter counter 212 could roll over its counter value n times for each one time the intensity counter 210 rolls over its counter value (where n>1).

Each of the counters 210 and 212 denotes any suitable structure for incrementing or decrementing a counter value. Various designs for counters are known in the art, such as those using multiple flip-flops. Also, each of the counters 210 and 212 could have any suitable resolution. For example, the filter counter 212 could output three-bit counter values, while the intensity counter 210 could output counter values having more than three bits each.

The outputs of the filter counter 212 are provided to a latch 214, which generates a signal based on whether the filter counter 212 is outputting a threshold value. For example, the latch 214 could output a high logic signal when the output of the filter counter 212 is all "1"s, and the latch 214 could output a low logic signal when the output of the filter counter 212 has any other value. In this example, the latch 214 therefore identifies when the filter counter 212 outputs a maximum counter value, although other approaches (such as signaling whenever the filter counter 212 outputs a minimum counter value) could be used. The latch 214 includes any suitable structure for detecting when a counter value has a specified value, such as a digital comparator.

Because the filter counter 212 has a lower bit resolution than the intensity counter 210, the filter counter 212 is used to identify when a bright intensity event occurs, even if the event is extremely short. For example, if an event occurs during a small portion of a periodic time interval and there is little or no illumination during the remainder of the time interval, the intensity counter 210 would effectively average the intensity over the entire length of the time interval, losing most or all information about the event. Because the filter counter 212 has a lower bit resolution, the filter counter 212 could reach the threshold value one or more times during the event. The latch 214 would therefore indicate one or more times that the threshold value has been reached by the filter counter 212, indicating that an event has occurred (even if the event is significantly shorter than the time interval and would not be discernable using the output of the intensity counter 210).

As shown in FIG. 2, the detector 200 outputs a signal 216 containing intensity values, which could denote the counter values generated by the intensity counter 210. The detector 200 also outputs a pixel event indictor signal 218, which is generated by the latch 214 and indicates when the latch 214 detects the threshold value from the filter counter 212. The detector 200 can optionally output a residue signal 220 containing the values output by the comparator 208.

Figure 3:
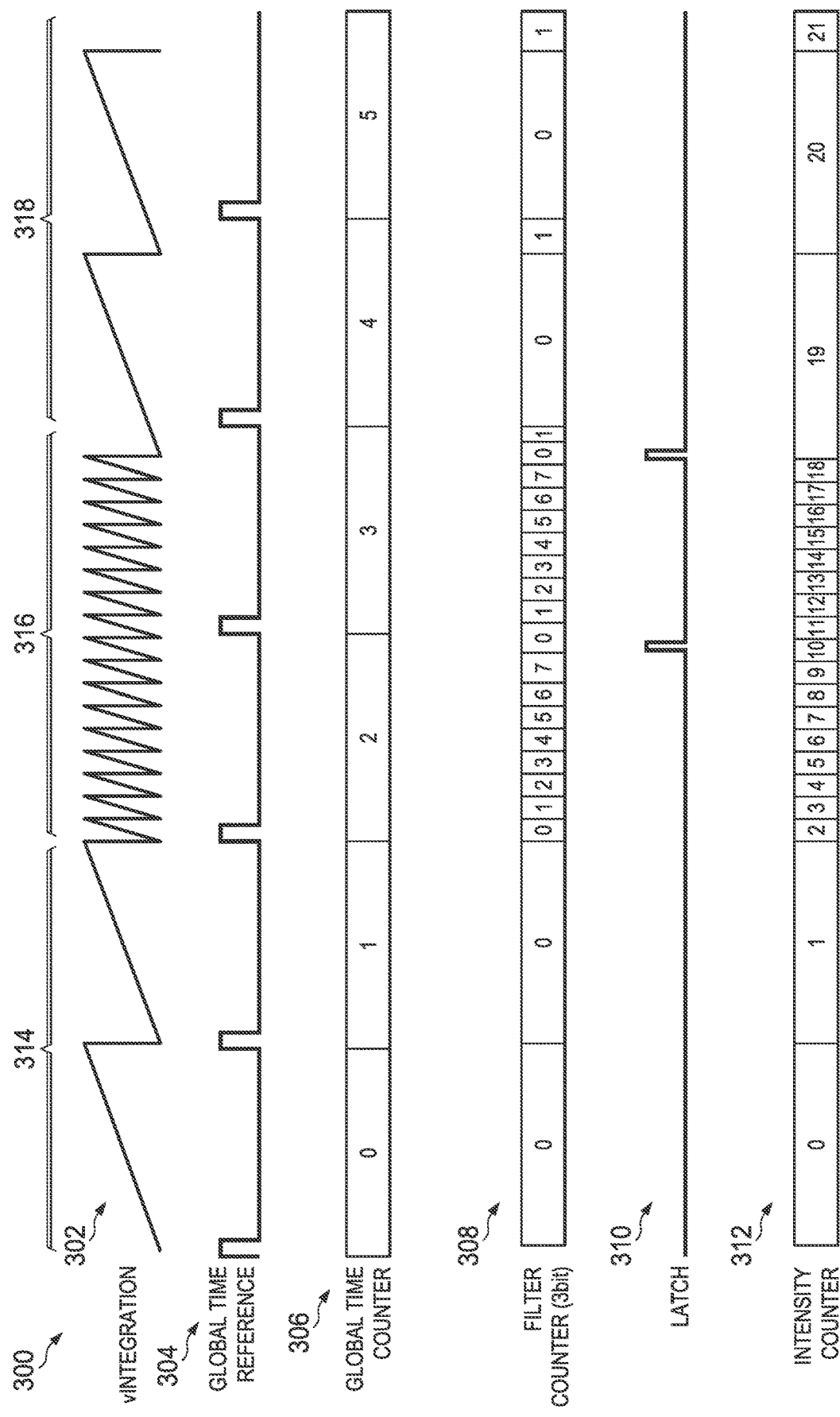
FIG. 3 illustrates an example timing diagram associated with operation of a pixel-based event detector according to this disclosure.

An example operation of these components of the detector 200 is shown in FIG. 3. FIG. 3 illustrates an example timing diagram 300 associated with operation of the pixel-based event detector 200 according to this disclosure. In FIG. 3, a vIntegration voltage 302 represents the voltage stored on the capacitor 204 by the pixel 202. A global time reference signal 304 and a global time counter value 306 are also shown here. The global time reference signal 304 defines the frequency reference for the detector 200, where the pulses in the global time reference signal 304 define repeating time intervals. The global time counter value 306 represents a count of those time intervals.

Counter values 308 include outputs from the filter counter 212, a signal 310 includes outputs from the latch 214 (as the pixel event indictor signal 218), and counter values 312 include outputs from the intensity counter 210 in the signal 216. These values are generated when processing the vIntegration voltage 302 shown in FIG. 3.

In this particular example, the vIntegration voltage 302 on the capacitor 204 can increase up to a maximum value, at which point the switch 206 is closed by the comparator 208 to reset the voltage on the capacitor 204. The intensity counter 210 increments its counter value 312 each time the vIntegration voltage 302 hits its maximum value. The filter counter 212 similarly increments its counter value 308 each time the vIntegration voltage 302 hits its maximum value. However, the filter counter 212 (with its lower bit resolution) can "roll over" its counter value 308 more frequently than the intensity counter 210, and the filter counter 212 is reset at each pulse in the global time reference signal 304 (each time interval) while the intensity counter 210 may be reset only for different frame intervals.

During time intervals 314 in FIG. 3, no bright events occur. As a result, the intensity counter 210 outputs a single counter value 312 during each period of the global time reference signal 304. Also, the filter counter 212 never counts an adequate number of values to hit the threshold value, so the latch 214 does not change the value in its output signal 310.

During time intervals 316, a bright event is occurring. This causes the capacitor 204 to hit its maximum charge and discharge much more rapidly. The intensity counter 210 increments its counter value 312 repeatedly during these time intervals 316 but never rolls over since the intensity counter 210 has a higher number of bits (of course, it could roll over once depending on the counter value 312 when the event began). In contrast, the filter counter 212 increments its counter value 308 repeatedly during these time intervals 316 and rolls over multiple times because the filter counter 212 has a lower number of bits. In this example, the latch 214 pulses its output signal 310 high whenever the filter counter 212 hits a value of "111," which occurs twice during the time intervals 316.

During time intervals 318, no bright events occur. As a result, the intensity counter 210 outputs a single counter value 312 during each period of the global time reference signal 304. Also, the filter counter 212 never counts an adequate number of values to hit the threshold value, so the latch 214 does not change the value in its output signal 310.

As can be seen in FIG. 3, the filter counter 212 and the latch 214 operate to identify an intensity increase, even though it occurs within short amount of time. The output of the intensity counter 210 (i.e., the counter values 312) may not adequately indicate that an event occurred. Even if it did, information could be lost due to the poor temporal resolution of the intensity counter 210. For example, the output of the intensity counter 210 in FIG. 3 merely indicates that the capacitor 204 hit its maximum charge 21 times over six time intervals. That might not register as a bright event in the system 100, in which case the system 100 would fail to detect that the intensity increased rapidly during part of the time.

Since the filter counter 212 has a lower resolution than the intensity counter 210, the bright event causes the filter counter 212 to repeatedly reach the threshold value at which the latch 214 pulses its output signal 310. The output signal 310 of the filter counter 212 can therefore be used as an indicator for a bright event, even if the bright event occurs more quickly than a single frame interval. Moreover, the pulses in the output signal 310 can provide temporal information regarding when the event occurred between two image frames.

Returning to FIG. 2, in order to reduce false alarms, the detector 200 includes a neighboring pixel filter and event flag generator 222. The neighboring pixel filter and event flag generator 222 receives the pixel event indictor signal 218 from the latch 214 of the detector 200, as well as one or more pixel event indictor signals 224 from one or more neighboring detectors. The neighboring pixel filter and event flag generator 222 determines whether the neighboring detector(s) detected the same event as the detector 200 and, if so, generates a pulse in an event indicator signal 226. As a result, actual events may only be identified if an adequate number of detectors 200 detect the same event. A random fluctuation in illumination at a single detector or a fault in a single detector might not trigger an event indicator.

The neighboring pixel filter and event flag generator 222 could receive pixel event indictor signals 224 from any suitable neighboring detectors, such as from a single neighbor, a subset of neighbors, or all neighbors. In some embodiments, the neighboring pixel filter and event flag generator 222 in each detector 200 receives pixel event indictor signals 224 from orthogonal neighboring detectors, such as neighboring detectors that are directly above, directly below, directly to the right, and directly to the left of that detector 200. However, other associations of the detectors 200 could also be used. The neighboring pixel filter and event flag generator 222 includes any suitable structure for determining whether multiple detectors identify an event. As a particular example, the neighboring pixel filter and event flag generator 222 could be implemented using one or more AND gates arranged and configured to output a specified logic value only when all inputs indicate that an event has been detected.

Figure 4:
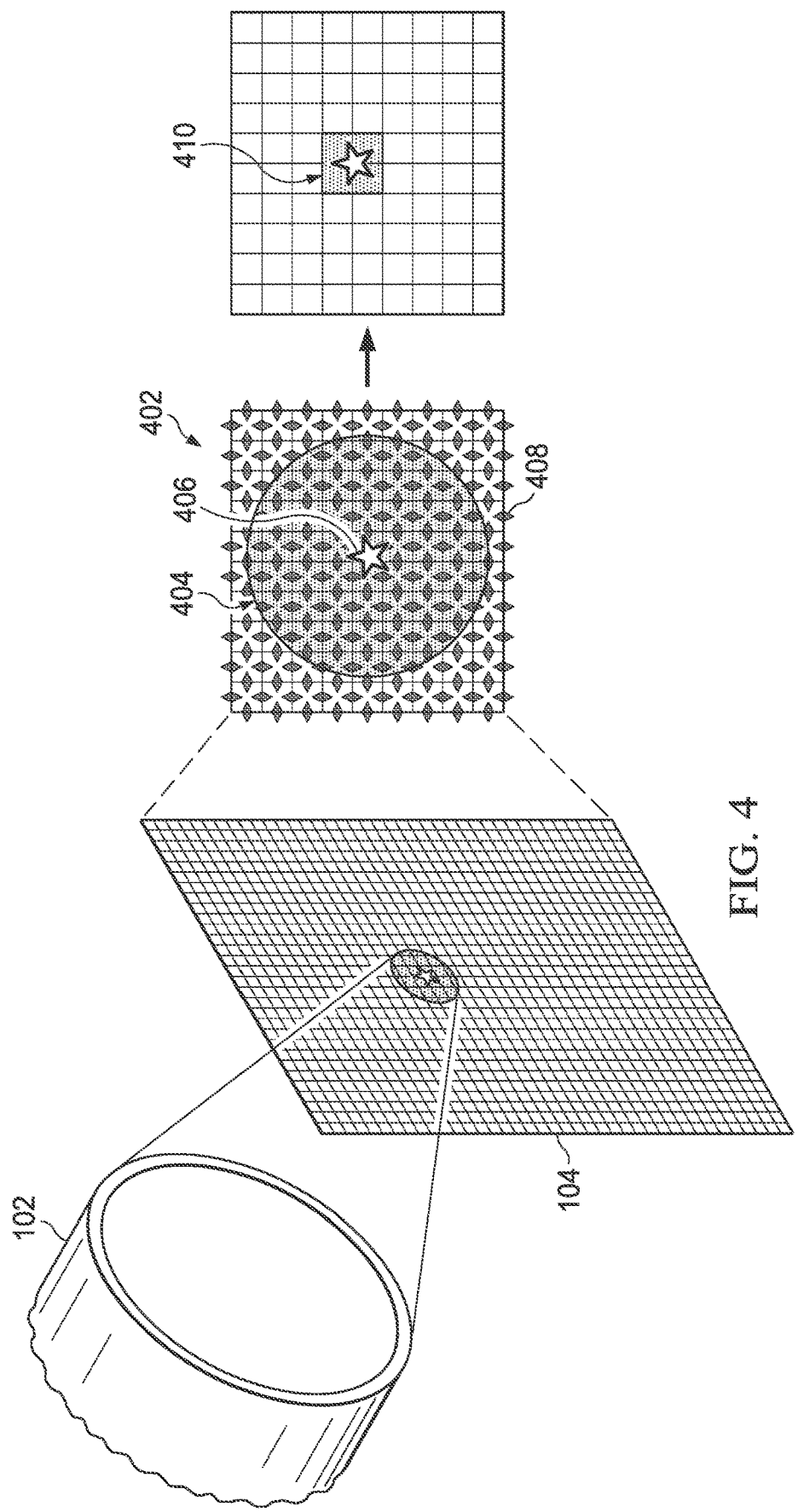
FIG. 4 illustrates an example use of a pixel-based event detector according to this disclosure.

An example of how multiple detectors 200 with neighbor filtering can be used in an imager is shown in FIG. 4. FIG. 4 illustrates an example use of the pixel-based event detector 200 according to this disclosure. As shown in FIG. 4, the focusing system 102 focuses light from a bright event onto a portion 402 of the focal plane array 104. A circle 404 denotes where light from the bright event hits the focal plane array 104, and a star 406 denotes the actual location of the bright event within a scene focused on the focal plane array 104. As can be seen here, the circle 404 is much larger than the actual event due to the optical "blooming" of bright illumination from the event.

Various diamonds 408 in FIG. 4 are used to denote linkages of detectors 200. This means that the neighboring pixel filter and event flag generator 222 in each detector 200 is configured to receive pixel event indictor signals 224 from four orthogonally-positioned neighboring detectors (except for those detectors located along edges of the focal plane array 104). This also means that each detector 200 provides its pixel event indictor signal 218 to four orthogonally-positioned neighboring detectors (except for those detectors located along edges of the focal plane array 104).

Assume that the neighboring pixel filter and event flag generator 222 in each detector 200 requires all four orthogonal detectors 200 to detect an event that is also detected by that detector 200 before a pulse in the event indicator signal 226 is generated. In that configuration, pulses would be generated in the event indicator signals 226 from only a small subset 410 of pixels in the focal plane array 104. In the example shown in FIG. 4, out of the ninety pixels in the portion 402 of the focal plane array 104, only four pixels generate pulses in their event indicator signals 226.

The detectors 200 therefore operate in a very rapid manner to detect bright events, even those with very small durations. The detectors 200 can also operate at a much higher frequency than the frame rate of the focal plane array 104. This allows the detectors 200 to provide indications of events without requiring the use of an increased frame rate (although higher-than-normal frame rates could still be used with the focal plane array 104). As a particular example, the detectors 200 could operate at a frequency of one or multiple kilo-Hertz, while the focal plane array 104 captures images at a frame rate of 60 Hertz. Moreover, by supporting "neighbor" filtering, the actual region associated with a bright event can be identified very quickly while providing the ability to suppress false alarms due to incorrect detector operations or faulty detectors. Effectively, the detectors 200 are frequency discriminators that allow intensity measurements, and the overall architecture supports massively parallel pixel-based event detection with both local region inhibition and limited event reporting through neighboring filtering.

When an event is detected, any suitable information can be derived by the processing system 106 or other system using the information from the detectors 200. For example, the processing system 106 or other system could use the event indicator signals 226 from the detectors 200 to identify the X-Y coordinates of the detecting pixels in the focal plane array 104, the center location of the detected event, the measured intensities from those pixels, and a timestamp for the event (or any subset of this information). This information could then be used to present information on the display 108, trigger the early warning indicator 110, or perform other functions.

This detector functionality could find use in a number of applications. For example, this functionality could be used to provide early warning indicators of incoming hostile fire for military or other personnel. As a particular example, the launch of a rocket propelled grenade typically includes two flashes of light, one when the rocket propelled grenade is launched from its tube and one when propellant in the rocket propelled grenade ignites. The processing system 106 could determine when multiple flashes are detected by the focal plane array 104 in rapid succession and trigger an early warning indicator 110 for a pilot or other personnel. The direction of travel for the grenade could also be estimated using the detected flashes. Other processing operations that could occur using data from the detectors 200 include detecting muzzle flashes from weapons fire or tracking objects based on glint or other reflections from the objects.

As another example, the processing system 106 or other system could use the outputs from the latches 214 of the detectors 200 to subtract the intensity as measured by the filter counters 212 of the detectors 200 from the intensity as measured by the intensity counters 210 of the detectors 200. This effectively removes intensity measurements related to a fast bright event from intensity measurements related to an overall scene, which can help to suppress flash, glint, or other illumination that might otherwise interfere with imaging of the scene. As a third example, glint or other reflections from an object of interest could be detected and used to track the object. A number of other functions could also occur based on knowledge of a rapid bright event, such as knowledge regarding the intensity of the event, the location of the event, or the timing of the event.

Although FIG. 2 illustrates one example of a pixel-based event detector 200 and FIGS. 3 and 4 illustrate example details regarding use of the detector 200, various changes may be made to FIGS. 2 through 4. For example, various components in FIG. 2 could be combined, further subdivided, rearranged, or omitted and additional components could be added according to particular needs. Also, FIG. 3 assumes that the counters 210 and 212 increment their counter values by one and that the latch 214 triggers a pulse when the output of the counter 212 is "111." However, the counters 210 and 212 could perform any suitable incrementing or decrementing operations to integrate intensity, and the latch 214 could be configured to detect any suitable threshold value from the counter 212. In addition, FIG. 4 assumes that the neighboring pixel filter and event flag generators 222 are configured to receive pixel event indictor signals 224 from four orthogonal neighboring detectors 200, although other types of pixel event indicator filtering could also be used.

Figure 5:
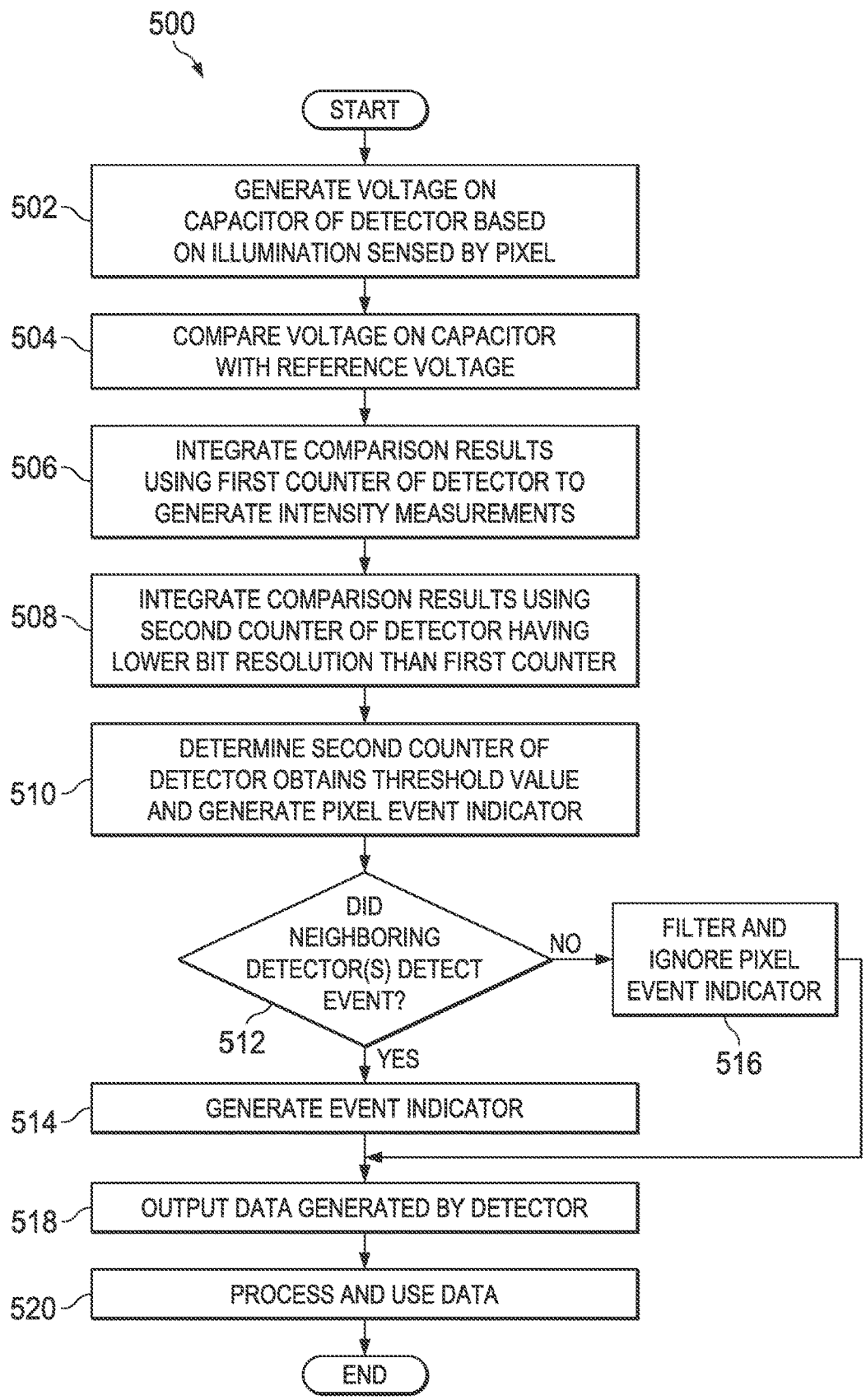
FIG. 5 illustrates an example method for pixel-based event detection according to this disclosure.

FIG. 5 illustrates an example method 500 for pixel-based event detection according to this disclosure. For ease of explanation, the method 500 is described as being performed by the detector 200 of FIG. 2 in the focal plane array 104 of FIG. 1 and by the processing system 106 of FIG. 1. Note, however, that the method 500 could be used with any other suitable device(s) and in any other suitable system.

As shown in FIG. 5, a voltage is generated on a capacitor of a detector based on illumination sensed by a pixel at step 502. This could include, for example, the pixel 202 generating an electrical signal and the capacitor 204 storing a voltage. The voltage stored on the capacitor is compared to a reference voltage at step 504. This could include, for example, the comparator 208 comparing the voltage stored on the capacitor 204 with a reference voltage and outputting a signal based on the comparison. The signal could have one value when the voltage stored on the capacitor 204 is lower than the reference voltage and another value when the voltage stored on the capacitor 204 is higher than the reference voltage. The signal from the comparator 208 can be used to control the switch 206 in order to reset the voltage on the capacitor 204 once the capacitor's voltage reaches the reference level.

The comparison results are integrated using a first counter of the detector in order to generate intensity measurements at step 506. This could include, for example, the intensity counter 210 incrementing or decrementing its counter value 312 each time the comparator 208 indicates that the voltage stored on the capacitor 204 reaches the reference voltage. The intensity counter 210 can be reset after any suitable length of time, such as once for each image frame being captured.

The comparison results are also integrated using a second counter of the detector, which has a lower bit resolution than the first counter, at step 508. This could include, for example, the filter counter 212 incrementing or decrementing its counter value 308 each time the comparator 208 indicates that the voltage stored on the capacitor 204 reaches the reference voltage. The filter counter 210 can be reset after any suitable length of time, such as after each pulse of the global time reference signal 304. In some embodiments, the filter counter 212 is a three-bit counter, while the intensity counter 210 supports more than three bits.

Depending on the illumination being received by the pixel, at some point a determination is made that the second counter obtains a threshold value, at which point a pixel event indication is generated at step 510. This could include, for example, the latch 214 determining that the counter value 308 from the filter counter 212 has a specified threshold value, such as all "1"s. This could also include the latch 214 generating a pulse in its output signal 310, which could also represent the pixel event indictor signal 218.

A determination is made whether one or more neighboring detectors detected an event at or near the same time at step 512. This could include, for example, the neighboring pixel filter and event flag generator 222 in the detector 200 determining whether pulses were received in the pixel event indictor signals 224 from one or more neighboring detectors 200. As noted above, the neighboring pixel filter and event flag generator 222 could receive signals from four orthogonal neighboring detectors, although other embodiments could be used. Also, the neighboring pixel filter and event flag generator 222 could be configured to verify whether one, some, or all of the neighboring detectors detected the same event.

If an adequate number (one, some, or all) of the neighboring detectors detected the same event (YES at step 512), an event indicator is generated at step 514. This could include, for example, the neighboring pixel filter and event flag generator 222 generating a pulse in the event indicator signal 226. Otherwise (NO at step 512), the pixel event indicator is filtered and ignored at step 516.

The data generated by the detector is output at step 518. This could include, for example, the detector 200 providing any pixel event indicators to one or more neighboring detectors, such as four orthogonal detectors or other detector(s). This could also include the detector 200 providing intensity measurements and any event indicators to the processing system 106. The data can be processed and used in any suitable manner at step 520. The exact processing can vary depending on the application. As noted above, a number of potential applications can use this detection technique, such as to perform incoming hostile fire detection, muzzle flash detection, or glint or flash suppression.

Although FIG. 5 illustrates one example of a method 500 for pixel-based event detection, various changes may be made to FIG. 5. For example, various steps in FIG. 5 could overlap, occur in parallel, occur in a different order, or occur any number of times. As a particular example, various steps in FIG. 5 can occur in parallel using different components of the detector 200.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
repeatedly charging and discharging a capacitor, the capacitor charged based on illumination received at a pixel;
comparing a voltage stored on the capacitor with a reference voltage using a comparator;
incrementing or decrementing a first counter value of a first counter of a detector during a first period of time, the first counter value incremented or decremented each time an output of the comparator indicates that the voltage stored on the capacitor has reached the reference voltage, the first counter value at an end of the first period of time indicative of an intensity of the illumination received by the pixel during the first period of time;

incrementing or decrementing a second counter value of a second counter of the detector during multiple smaller second periods of time within the first period of time, the second counter value incremented or decremented each time the output of the comparator indicates that the voltage stored on the capacitor has reached the reference voltage, the second counter having a lower bit resolution than the first counter so that the second counter is able to roll over the second counter value more frequently than the first counter is able to roll over the first counter value;

resetting the second counter for each of the second periods of time; and generating a pixel event indicator in response to the second counter value obtaining a specified value indicative of a bright intensity event.

2. The method of claim 1, wherein the bright intensity event has a duration that is shorter than the first period of time.

3. The method of claim 1, further comprising:
determining whether one or more neighboring detectors also generated one or more pixel event indicators; and
generating an event indicator identifying the bright intensity event when the one or more neighboring detectors also generated the one or more pixel event indicators.

4. The method of claim 3, wherein the one or more neighboring detectors comprise four neighboring detectors that are orthogonal with respect to the detector.

5. The method of claim 1, further comprising:
incrementing or decrementing the first counter value of the first counter during multiple first period of times; and
incrementing or decrementing the second counter value of the second counter during smaller second periods of time within each of the first period of times.

6. The method of claim 5, wherein the pixel event indicators are generated at a higher temporal resolution than intensity values representing the intensity of the illumination.

7. The method of claim 1, further comprising:
using the output of the comparator to control a switch; and
using the switch to control the charging and discharging of the capacitor.

8. An apparatus comprising:
a capacitor configured to be repeatedly charged based on illumination received at a pixel and discharged;
a comparator configured to compare a voltage stored on the capacitor with a reference voltage; and
a detector comprising:
a first counter configured to increment or decrement a first counter value during a first period of time, the first counter configured to increment or decrement the first counter value each time an output of the comparator indicates that the voltage stored on the capacitor has reached the reference voltage, the first counter value at an end of the first period of time indicative of an intensity of the illumination received by the pixel during the first period of time;
a second counter configured to increment or decrement a second counter value during multiple smaller second periods of time within the first period of time, the second counter configured to increment or decrement the second counter value each time the output of the comparator indicates that the voltage stored on the capacitor has reached the reference voltage, the second counter having a lower bit resolution than the first counter so that the second counter is able to roll over the second counter value more frequently than the first counter is able to roll over the first counter value, the second counter configured to be reset for each of the second periods of time; and
a latch configured to generate a pixel event indicator in response to the second counter value obtaining a specified value indicative of a bright intensity event.

9. The apparatus of claim 8, wherein the bright intensity event has a duration that is shorter than the first period of time.

10. The apparatus of claim 8, wherein the detector further comprises a filter configured to:
determine whether one or more neighboring detectors also generated one or more pixel event indicators; and
generate an event indicator identifying the bright intensity event when the one or more neighboring detectors also generated the one or more pixel event indicators.

11. The apparatus of claim 10, wherein the one or more neighboring detectors comprise four neighboring detectors that are orthogonal with respect to the detector.

12. The apparatus of claim 8, wherein:
the first counter is configured to increment or decrement the first counter value during multiple first period of times; and
the second counter is configured to increment or decrement the second counter value during smaller second periods of time within each of the first period of times.

13. The apparatus of claim 8, further comprising:
a switch configured to be selectively closed in order to discharge the capacitor;
wherein the switch is configured to be controlled based on the output of the comparator.

14. A system comprising:
a focal plane array comprising multiple pixels; and
for each of at least some of the pixels:
a capacitor configured to be repeatedly charged based on illumination received at the pixel and discharged;
a comparator configured to compare a voltage stored on the capacitor with a reference voltage; and
a detector comprising:
a first counter configured to increment or decrement a first counter value during a first period of time, the first counter configured to increment or decrement the first counter value each time an output of the comparator indicates that the voltage stored on the capacitor has reached the reference voltage, the first counter value at an end of the first period of time indicative of an intensity of the illumination received by the pixel during the first period of time;
a second counter configured to increment or decrement a second counter value during multiple smaller second periods of time within the first period of time, the second counter configured to increment or decrement the second counter value each time the output of the comparator indicates that the voltage stored on the capacitor has reached the reference voltage, the second counter having a lower bit resolution than the first counter so that the second counter is able to roll over the second counter value more frequently than the first counter is able to roll over the first counter value, the second counter configured to be reset for each of the second periods of time; and a latch configured to generate a pixel event indicator in response to the second counter value obtaining a specified value indicative of a bright intensity event.

15. The system of claim 14, wherein the bright intensity event has a duration that is shorter than the first period of time.

16. The system of claim 14, wherein each detector further comprises a filter configured to:
   determine whether one or more neighboring detectors also generated one or more pixel event indicators; and
   generate an event indicator identifying the bright intensity event when the one or more neighboring detectors also generated the one or more pixel event indicators.

17. The system of claim 14, wherein, in each detector:
   the first counter is configured to increment or decrement the first counter value during multiple first period of times; and
   the second counter is configured to increment or decrement the second counter value during smaller second periods of time within each of the first period of times.

18. The system of claim 14, further comprising:
   a processing system configured to receive and process information from the focal plane array.

19. The system of claim 18, wherein:
   the processing system is configured to receive and display images captured by the focal plane array at a first rate; and
   the second counters and the detectors are configured to operate at a second rate higher than the first rate.

20. The system of claim 18, wherein the processing system is further configured to at least one of:
   trigger a warning in response to the bright intensity event;
   display information associated with the bright intensity event;
   track an object based on the bright intensity event; and
   subtract the second counter values output by the second counters from the first counter values output by the first counters to provide glint or flash suppression in one or more images.

* * * * *